United States Patent [19]

Patel

[11] Patent Number: 4,945,538
[45] Date of Patent: Jul. 31, 1990

[54] METHOD AND APPARATUS FOR PROCESSING SAMPLE VALUES IN A CODED SIGNAL PROCESSING CHANNEL

[75] Inventor: Arvind M. Patel, San Jose, Calif.

[73] Assignee: International Business Machines Corporation, Armonk, N.Y.

[21] Appl. No.: 270,895

[22] Filed: Nov. 14, 1988

[51] Int. Cl.$^5$ .............................................. G06F 11/10
[52] U.S. Cl. .......................................... 371/43; 371/44
[58] Field of Search ................... 371/43, 37.1, 37.2, 371/37.3, 37.4, 37.5, 37.6, 37.8, 37.9, 38.1, 39.1, 44; 364/200, 900

[56] References Cited

U.S. PATENT DOCUMENTS

| | | | |
|---|---|---|---|
| 4,777,636 | 10/1988 | Yama et al. | 371/43 |
| 4,792,952 | 12/1988 | Weston | 371/43 |
| 4,805,174 | 2/1989 | Kabota | 371/43 |
| 4,811,346 | 3/1989 | Battail | 371/43 |
| 4,823,346 | 4/1989 | Kobayashi | 371/43 |

OTHER PUBLICATIONS

Kabal et al., "Partial-Response Signaling", IEEE Trans. on Comm., vol. COM-23, No. 9, Sep. 1975, pp. 921-934.

Forney, "Maximum-Likelihood Sequence Estimation of Digital Sequences in the Presence of Intersymbol Interference", IEEE Trans. on Info. Theory, vol. IT-18, No. 13, May 1972.

Kobayashi, "Application of Probabilistic Decoding to Digital Magnetic Recording Systems", IBM J. Res. Develop., Jan. 1971.

Nishimura et al., "A Design Method for Optimum Equalization in Magnetic Recording with Partial Response Channel Coding", IEEE Trans. on Mag., vol. MAG-19, No. 5, Sep. 1983, pp. 1719-1721.

Forney, "The Viterbi Algorithm", Proc. of the IEEE, vol. 61, No. 3, 3/73.

Thapar and Patel, "A Class of Partial Response Systems for Increasing Storage Density in Magnetic Recording", IEEE Trans. Magnetics, vol. MAG-23, No. 5, Sep. 1987 at pp. 3666-3668.

*Primary Examiner*—Michael R. Fleming
*Attorney, Agent, or Firm*—Henry E. Otto, Jr.

[57] ABSTRACT

A method and apparatus for processing, in a signal processing channel, digital values corresponding to a digitized incoming analog signal representative of coded binary data. Using a state-dependent sequence detection algorithm appropriate functional expressions of digital sample values are precomputed at each cycle of the digitizing clock for a preselected number of bits ahead of the current bit. Preselected ones of these expressions are compared against corresponding thresholds to provide respective binary decision outputs that, with state values corresponding to the current state, determine state values for the next state and decode one bit of coded binary data at each clock cycle. Programmed values generated for the thresholds may be adaptively modified according to changes in sample values in the incoming analog signal relative to corresponding expected sample values. Different thresholds are used for positive and negative phases of the analog signal shape to accommodate signal shape asymmetry. Because the decoder is programmable, threshold constants at different tracks or bands of tracks in a disk file can be changed to optimize performance at all tracks of the file.

24 Claims, 5 Drawing Sheets

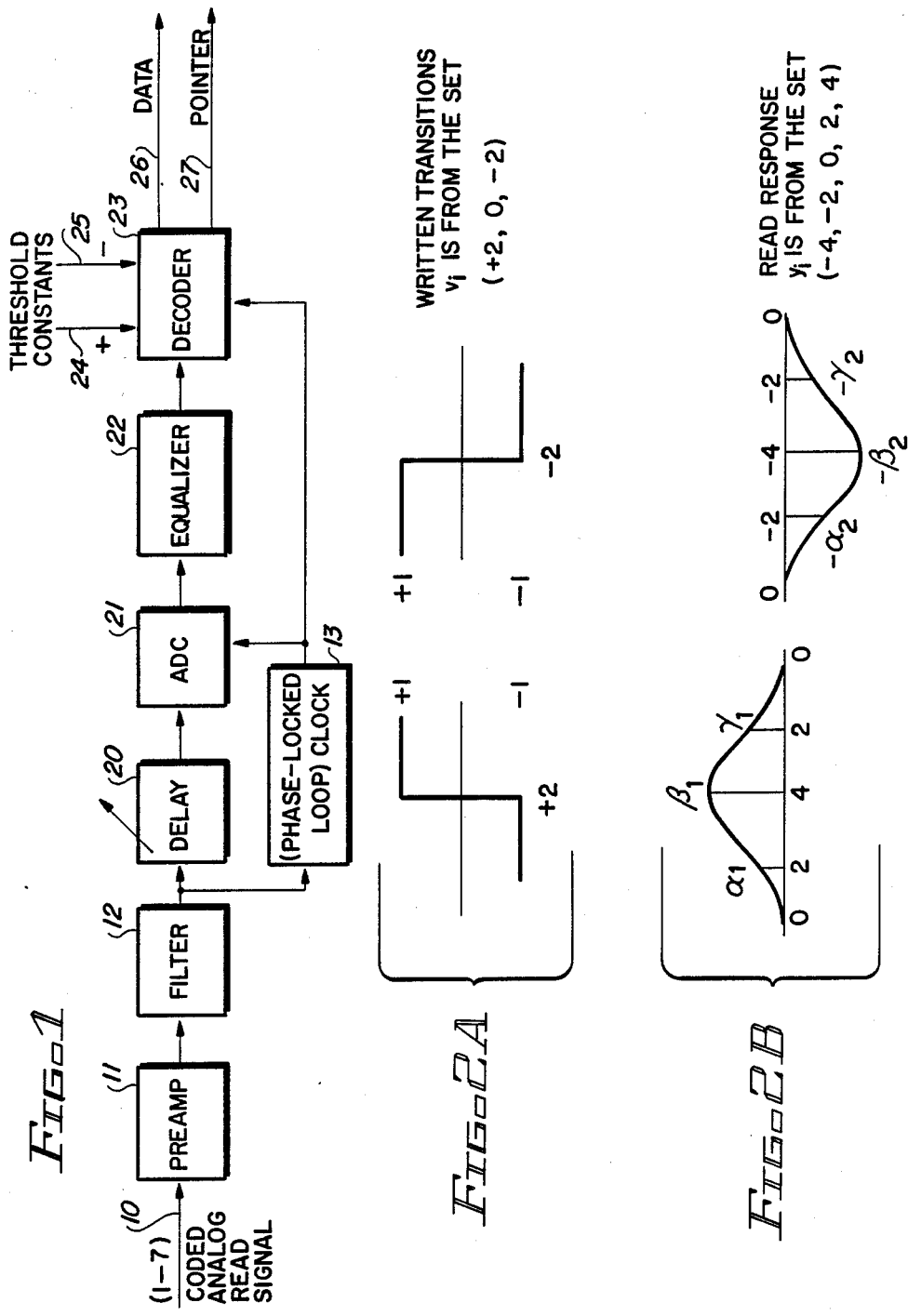

METHOD AND APPARATUS FOR PROCESSING SAMPLE VALUES IN A CODED SIGNAL PROCESSING CHANNEL

This invention relates to a method and apparatus for processing signals in a channel, and more particularly to processing, in a signal processing channel, sample values corresponding to a digitized and equalized analog signal representative of coded binary data transmitted via the channel.

SUMMARY OF THE INVENTION

The trend towards high density and high data rates presents heavy demands on the signal detection process in a magnetic recording channel. A peak-detection channel, with analog signal processing of one bit at a time, is now widely used in magnetic recording storage products. Due to increases in density and data rates, the one-bit detection window in the conventional peak detection channel becomes very small, which limits detection reliability. An alternative channel, called partial response maximum likelihood (PRML) channel, is discussed in the following papers:

(1) Kabal et al, "Partial-Response Signaling", IEEE Trans. on Comm., vol. COM-23, NO. 9, September 1975.

(2) Forney, "Maximum-Likelihood Sequence Estimation of Digital Sequences in the Presence of Intersymbol Interference", IEEE Trans. on Info. Theory, vol. IT-18, No. 3, May 1972.

(3) Kobayashi, "Application of Probabilistic Decoding to Digital Magnetic Recording Systems", IBM J. Res. Develop., January 1971.

(4) Nishimura et al, "A Design Method for Optimum Equalization in Magnetic Recording with Partial Response Channel Coding", IEEE Trans. on Mag., vol. MAG-19, No. 5, September 1983.

(5) Forney, "The Viterbi Algorithm", Proc. of the IEEE, vol. 61, No. 3, 3/73.

In the PRML channel, characterized by the polynomial $(1-D)(1+D)$, a notch filter is needed because the frequency response requires a sharp cutoff and the frequency spectrum is very different from that of the channel response in magnetic recording.

In "A Class of Partial Response Systems for Increasing Storage Density in Magnetic Recording", H. K. Thapar and A. M. Patel, IEEE Trans. Magnetics, Vol. MAG-23, No. 5, September 1987 at pp. 3666–3668, an extended partial response maximum likelihood (EPRML) channel is described characterized by the polynomial $(1-D)(1+D)^2$. In this signaling method, the signal spectrum resembles a typical magnetic-recording channel transfer function. It desirably obviates the need for the notch filter. However, in this channel, the Viterbi type computations for maximum likelihood detection become a limiting factor in terms of decoding speed and cost. Furthermore, both PRML and EPRML channels are very sensitive to misequalization or changes in signal shape due, for example, to component tolerances and to nonlinearities of the magnetic recording process such as caused by pulse asymmetry and the crowding of write transitions on the media.

There is a need for a signal processing method and apparatus wherein (1) a run-length limited (RLL) code of the peak-detection channel is used to control the crowding of write transitions on the media, (2) a sequence detection algorithm is used that avoids the complexity of Viterbi-type computations, and (3) the detection process is tolerant to signal shape variations in order to remove stringent requirements for signal equalization and accommodate nonlinearities of the magnetic recording process.

SUMMARY OF THE INVENTION

Toward this end and according to the invention, a method and apparatus are provided for processing, in a signal processing channel, sample values of an analog signal corresponding to binary data coded with a RLL code, such as the (1,7) code. The coded analog input signal is converted by an analog-to-digital converter (ADC) to a sequence of digital sample values at successive clock times. The signal is equalized, either after the ADC by a digital equalizer or before the ADC with an analog filter or (as illustrated) by a combination of the two, to correspond to a predetermined analog shape. Then a sequence detection algorithm is used to decode the digital sample values into the coded binary data. The decoder is preferably programmable to adjust the thresholds in positive and negative phases of the decoder when anomalies in signal shape cannot be compensated for by the equalizer. If desired, the decoder can be continuously adaptive to adjust to variations in signal shape.

The method and apparatus herein disclosed for processing the sample values desirably:

(1) Uses a channel with a signaling method that eliminates the need for a notch filter and processes (1,7) coded analog signals.

(2) Converts the analog input signal to a sequence of digital sample values that corresponds to a predetermined equalized analog shape.

(3) Avoids Viterbi-type computations yet obtains near-optimum performance by a state dependent look-ahead technique focusing on the minimum-distance and next most likely error events.

(4) Utilizes a programmable decoder that is capable of adjusting to variations in signal shape; and (5) Flags, during the look-ahead process, a previously made decision that is suspected of being in error.

BRIEF DESCRIPTION OF THE DRAWINGS

FIG. 1 is a schematic diagram of a coded digital signal processing channel embodying the invention;

FIG. 2A depicts written transitions of magnitude 2 between +1 and −1 levels of magnetic saturation, and FIG. 2B depicts a read response normalized by a scaling factor to correspond to said written transitions;

DESCRIPTION OF PREFERRED EMBODIMENT

Figure 3:
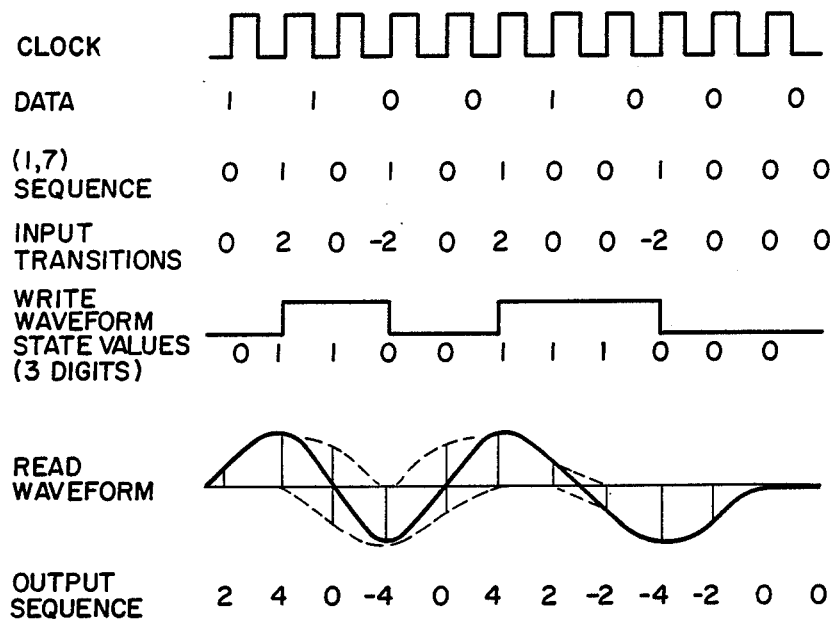
FIG. 3 shows write and read waveforms for (1,7) coded data and read sample values.

As illustrated in FIG. 1, the apparatus embodying the invention comprises a signal processing channel including a line 10 via which an analog read signal is fed from a transducer such as a magnetic or optical read head in a digital storage device. This read signal corresponds to a recorded (1,7) data sequence, which is a binary data sequence coded with the (1,7) RLL code during the write operation. The read signal passes through a preamplifier 11 with automatic gain control (AGC) and a low bandpass filter 12. The output of filter 12 is supplied to a phase-locked clock 13 comprising a phase-locked loop timing recovery circuit including a variable frequency oscillator (VFO). The apparatus, as thus far described, may be identical with that used in the conventional peak-detection channel with (1,7) code.

The channel is preferably of the type referred to as extended partial response maximum likelihood (EPRML) channel which is characterized by the polynomial $(1-D)(1+D)^2$. In EPRML signaling, the signal spectrum resembles a typical magnetic recording channel transfer function, desirably obviating the need for the notch filter required in the normal PRML channel characterized by the polynomial $(1-D)(1+D)$.

More specifically, the filter 12 and equalizer 22 operate to filter the read signal so that the response to a single magnetic transition is a pulse given by the sample values ..., 0, 2, 4, 2, 0, ... FIG. 2A depicts written transitions of magnitude 2 between +1 and −1 levels of magnetic saturation; and FIG. 2B depicts the read response that is normalized by a scaling factor to correspond thereto.

In the environment herein described, use of the (1,7) RLL code reduces crowding of write transitions on the media to $\frac{2}{3}$ that experienced with the PRML or EPRML channel. The (1,7) code acts as a trellis code providing a built-in redundancy with its $\frac{2}{3}$ rate. It is very tolerant to nonlinearities in a high-density, high-data-rate magnetic recording channel.

Briefly, according to the invention, the coded analog read signal output from filter 12 is supplied to a delay means 20. Delay means 20 may be a digital chip of the type designated as the PECLDL-28-01 Programmable Logic Delay Line, marketed by Engineered Components Company of San Luis Obispo, Calif., and which permits selectively adjustable delays in increments as low as a tenth of a nanosecond, depending upon the rate of the clock. Delay means 20 provides delay alignment between the analog signal and clock signal inputs to an analog-to-digital converter (ADC) 21. ADC 21 converts the analog input signal into digital sample values at successive clock times. These digital sample values, in some cases (depending on the characteristic of filter 12) may be equalized by an equalizer 22. The digital sample values are then passed to a decoder 23. Positive and negative threshold constants are applied via lines 24,25, respectively, to decoder 23. Decoder 23 applies a decoding algorithm to the equalized digitized sample values to provide a coded binary data output in line 26 and, where appropriate, a pointer flag in line 27, at successive clock times under control of clock 13.

FIG. 3 depicts the write and read waveforms and associated sequences of data and sample values in a noise-free environment as they are clocked by clock 13. With the pulse shape as shown in FIGS. 2A, 2B, the sample values, in accord with the decoder implementation, will range through the discrete set $\{-4, -2, 0, +2, +4\}$. Actual samples, however, will include signal anomalies and additive noise, and thus will range through various noninteger values around the integers in the discrete set.

The read clock is derived from read signal 10 using a conventional peak-detection circuit driving a variable frequency oscillator (VFO) in the clock 13. As earlier noted, the ADC 21 under control of clock 13 converts the analog signal to digitized sample values at successive clock times; and the digitized sample values are equalized at 22.

Figure 4:
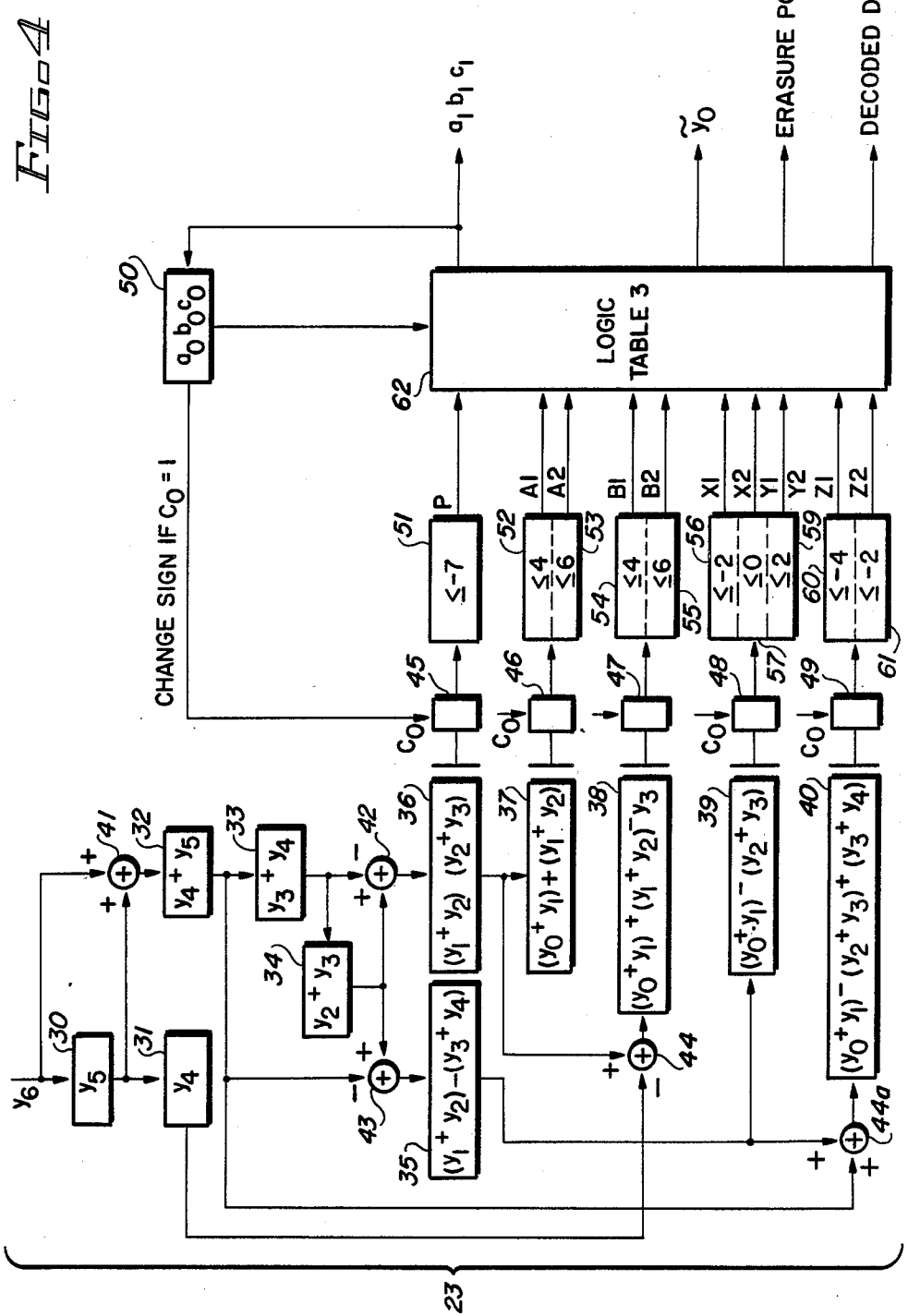
FIG. 4 is a schematic diagram of a decoder embodying a look-ahead feature and decision boundaries for implementing the invention.

Assume that $y_i$ denotes the digitized sample value corresponding to the $i^{th}$ clock cycle. Then, as illustrated in FIG. 4, the current value of $y_i$ is illustrated as $y_0$, corresponding to the current clock cycle $i=0$. Decoder 23 processes these digitized equalized sample values iteratively, receiving one new sample per clock time with a look-ahead of six sample values. Thus, decoder 23 receives $y_{i+6}$ as it processes the previously received samples and decodes $y_i$ into the $i^{th}$ digit of the recorded sequences. It should be noted that the decoding process is state dependent. The state of decoder 23 at the $i^{th}$ clock cycle is represented by a three digit binary number $a_i b_i c_i$ where $a_i$, $b_i$ and $c_i$ represent the binary logic levels of the write current (as illustrated in FIG. 3) for the last three bit values at the ith clock cycle. This identifies one of the six possible states, namely, 000, 100, 110, 111, 011, and 001. (The states 101 and 010 do not occur with (1,7) coded data employed in an EPRML channel). During each cycle of clock 13, decoder 23 determines one digit of the recorded (1,7) sequence and also identifies the next decoder state for processing of the next cycle.

THE DECODING ALGORITHM

Decoder 23 executes an algorithm using the equations in Tables 1 and 2. In this algorithm, the sample value that is currently being decoded is denoted by $y_0$, corresponding to the clock cycle $i=0$. The process is iterative and is driven by read clock 13.

According to a feature of the invention, decoder 23 is "state dependent"; i.e., given the current state $a_0 b_0 c_0$ and sample values $y_0$, $y_1$, $y_2$, $y_3$ and $y_4$, the decoder determines the noise-free sample value $y_0$ (corresponding to $y_0$) and the resultant next state $a_1 b_1 c_1$. It also decodes this state into a 1 or 0 (presence or absence of a magnetic transition) in the originally recorded (1,7) data sequence. The actual decision results from the outcome of the tests on the sample values as given by the equations in Tables 1 and 2 as decoder 23 moves from one state to another. Note that the movement from one state to another is highly structured and that the form of the equations is very simple and similar at various states. The states 110, 100 and 000 (Table 1) corresponding to the positive phase of the signal have mirror image symmetry with states 001, 011, and 111 respectively (Table 2) corresponding to the negative phase of the signal. The mirror image symmetry is characterized by a change in the sign for all the sample values in the corresponding places in Tables 1 and 2.

The decisions of decoder 23 are driven by the outcome of three basic checks: namely, (i) the baseline check; (ii) the peak-position check; and (iii) the phase check. The outcomes of these checks are represented in the form of Boolean variables (see FIG. 4) denoted by $A_1$, $A_2$, $B_1$ and $B_2$ for the baseline check; and by $Q_1$ and $Q_2$ for the peak-position check, where $Q_1$ and $Q_2$ are functions of more specific checks represented by $X_1$, $X_2$, $Y_1$, $Y_2$, $Z_1$ and $Z_2$; and by the Boolean variable p for the phase check. Each check is a comparison of a specific function of the sample values against a fixed threshold. Each threshold is represented by a corresponding constant that is strongly related to the shape of the readback signal and defined by the right-hand side of the corresponding test equation. In the following test equations, the threshold constants correspond to the nominal pulse shape with sample values ..., 0, 2, 4, 2, 0, ... and ..., 0, −2, −4, −2, 0, ... as illustrated in FIG. 2B.

(i) Baseline Check ($A_1$, $A_2$, $B_1$ and $B_2$)

$$A_1 = 1 \text{ implies } (y_0+y_1)+(y_1+y_2) \leq 4 \quad (1)$$

$$A_2 = 1 \text{ implies } (y_0+y_1)+(y_1+y_2) \leq 6 \quad (2)$$

$$B_1 = 1 \text{ implies } (y_0+y_1)+(y_1+y_2)-y_3 \leq 4 \quad (3)$$

$$B_2 = 1 \text{ implies } (y_0+y_1)+(y_1+y_2)-y_3 \leq 6 \quad (4)$$

(ii) Peak-Position Check $Q_1$ and $Q_2$

The expression $$\left\lceil (y_3 + y_4) \right\rceil_a^b$$

is defined as follows:

$$\left\lceil (y_3 + y_4) \right\rceil_a^b = \begin{bmatrix} a & \text{if } (y_3 + y_4) \leq a \\ b & \text{if } (y_3 + y_4) \geq b \\ (y_2 + y_4) & \text{if } a < (y_3 + y_4) < b \end{bmatrix} \quad (5)$$

Then, the peak-position check represented by Boolean variables $Q_1$ and $Q_2$ is expressed as follows:

$$Q_1 = 1 \text{ implies} \quad (6)$$

$$(y_0 + y_1) - (y_2 + y_3) + \left\lceil (y_3 + y_4) \right\rceil_{-4}^{-2} \leq -4$$

$$Q_2 = 1 \text{ implies} \quad (7)$$

$$(y_0 + y_1) - (y_2 + y_3) + \left\lceil (y_4 + y_3) \right\rceil_{-4}^{-2} \leq -2$$

where $$Q_1 = X_1 + Y_1 Z_1 \quad (8)$$

$$Q_2 = X_2 + Y_2 Z_2 \quad (9)$$

and $$X_1 = 1 \text{ implies } (y_0+y_1)-(y_2+y_3) \leq -2 \quad (10)$$

$$X_2 = 1 \text{ implies } (y_0+y_1)-(y_2+y_3) \leq 0 \quad (11)$$

$$Y_1 = 1 \text{ implies } (y_0+y_1)-(y_2+y_3) \leq 0 \quad (12)$$

$$Y_2 = 1 \text{ implies } (y_0+y_1)-(y_2+y_3) \leq 2 \quad (13)$$

$$Z_1 = 1 \text{ implies } (y_0+y_1)-(y_2+y_3)+(y_3+y_4) \leq -4 \quad (14)$$

$$Z_2 = 1 \text{ implies } (y_0+y_1)-(y_2+y_3)+(y_3+y_4) \leq -2 \quad (15)$$

(iii) Phase Check (p)

$$p = 1 \text{ implies } (y_1+y_2)+(y_2+y_3) \leq -7 \quad (16)$$

The above tests correspond to the equations in Table 1 where $c_0 = 0$ which corresponds to the states in the positive phase of the signal. The same tests are used with a sign change to all the sample values when $c_0 = 1$ for the equations in Table 2 which corresponds to the states in the negative phase.

The hardware of decoder 23 is shown in FIG. 4. Registers 30-40 hold the respective interim functions of the sample values $y_0$ through $y_4$ as shown. During each cycle, the content of each register 30-40 is moved in the direction of the arrow to the next register as appropriate functions are created through five adder circuits 41-44, 44a. Sign change blocks 45-49 change the sign of the incoming binary number whenever the $c_0$ bit in a state register 50 has the value "1". The outputs from the respective sign change blocks 45-49 are fed to comparators 51-61 as shown in FIG. 4. The outputs of comparators 51-61 correspond to those shown in Equations 1-4 for the variables $A_1$, $A_2$, $B_1$, and $B_2$; Equations 5-15 for the variables $X_1$, $X_2$, $Y_1$, $Y_2$, $Z_1$ and $Z_2$, respectively; and Equation 16 for the variable p. The outputs from the comparators 51-61 are values "1" or "0" which together with the state values $a_0$, $b_0$, $c_0$ from state register 50, are fed to the logic block 62 for implementing the logic shown in Table 3.

The logic of block 62 provides the decoded data $d_0$ corresponding to state $a_0 b_0 c_0$ and the erasure pointer in accordance with the logic of section 1 of Table 3. Block 62 also creates the state value $a_1 b_1 c_1$ for the next state in accordance with the logic of section 2 of Table 3. This state value is supplied to state register 50 to become the current state value $a_0 b_0 c_0$ for the next clock cycle. Block 62 also determines the "expected sample value" (i.e., maximum likely sample value) $\bar{y}_0$ in accordance with the logic of section 3 of Table 3.

PROGRAMMABLE OR ADAPTIVE DECODING

The decoder 23 structure provides considerable flexibility towards adaptation to the signal and noise environment. The shape of the analog read signal varies with the radius on the surface of a magnetic disk. It is also affected by the head geometry, which often shows up as an unavoidable nonsymmetry of the positive and negative readback pulses. These and other anomalies in the signal shape cannot always be completely compensated for by the filter 12 or equalizer 22, or at least it is not always easy and cost effective to attempt to do so.

Decoder 23 provides means to compensate for this misequalization. For this purpose, the read responses to the positive and negative magnetic transitions are characterized by the pulses with sample values ... 0, $\alpha_1$, $\beta_1$, $\gamma_1$, 0, ... and ... 0, $-\alpha_2$, $-\beta_2$, $-\gamma_2$, 0 ..., respectively (see FIG. 2B). In other words, $\alpha_1$, $\beta_1$, $\gamma_1$, $-\alpha_2$, $-\beta_2$, $-\gamma_2$ defines the signal shape for accommodating non-linearities and small variations around the nominal sample values which, as illustratively assumed in FIG. 2B and previous description, are given by $\alpha_1 = \alpha_2 = 2$, $\beta_1 = \beta_2 = 4$ and $\gamma_1 = \gamma_2 = 2$.

In Table 4, the programmable values of the threshold constants for each test are expressed as a function of the signal shape given by the general parameters $\alpha_1$, $\beta_1$, $\gamma_1$, $-\alpha_2$, $-\beta_2$, $-\gamma_2$. In event of nonsymmetry in the shape of positive and negative readback pulses, the threshold constants for the corresponding tests in the two phases of the decoder (in Tables 1 and 2, respectively) will not always be equal.

In Table 4, the threshold constants for the positive phase are indicated with a plus sign, and those for the negative phase are indicated with a minus sign. For example, the test corresponding to Boolean variable $A_1$ will use the constant $K(A_1+)$ for the states in the positive phase (states with $c_0 = 0$) and the constant $K(A_1-)$ for the states in the negative phase (states with $c_0 = 1$).

Figure 5:
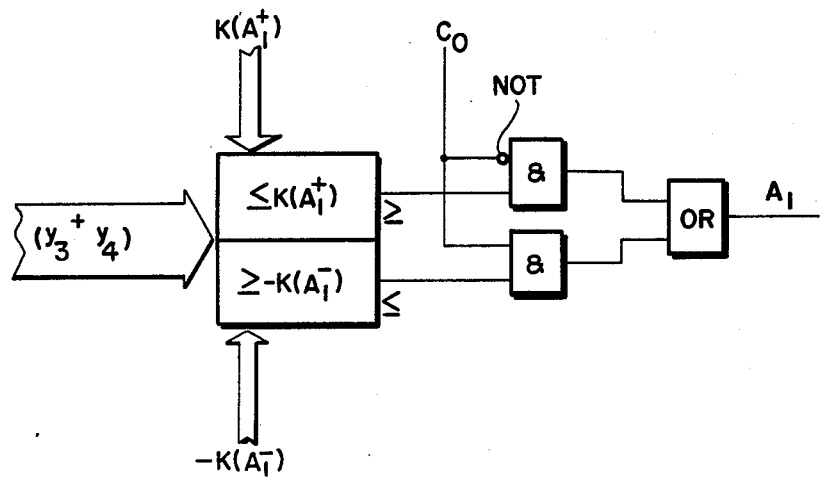
FIG. 5 is a diagram illustrating how the decoder shown in FIG. 4 may be modified to a programmable decoder that adjusts to variations in analog input signal shape.

Thus, in FIG. 4, the comparator circuit corresponding to the Boolean variable A will be supplied with two different values for the constant operand, namely $K(A_1+)$ and $K(A_1-)$, and the output will be gated selectively according to whether the condition is $c_0=0$ or $c_0=1$, as shown in FIG. 5. (The sign change block 45 is then not required.) The comparator circuit for each of the eleven Boolean variables (namely, $A_1$, $A_2$, $B_1$, $B_2$, $X_1$, $X_2$, $Y_1$, $Y_2$, $Z_1$, $Z_2$ and p) will be similarly modified to receive two different values for the constant operand, and the output will be gated selectively according to whether the condition is $c_0=0$ or $c_0=1$.

According to an important feature of the invention, when anomalies in the signal shape cannot be compensated for by a filter and an equalizer, such as 12 and 22, the programmable decoder 23 provides an easy means to compensate for misequalization by adjusting the thresholds in the two phases of the decoder. This flexibility permits operating decoder 23 at near-optimum performance even in the absence of ideal shape of the readback signal. In disk files, this is especially important because the programmability of the decoder can be used to change threshold constants at different tracks or bands of tracks and obtain near-optimum performance at all tracks.

According to another feature of the invention, programmable decoder 23 may be used with a partially equalized or even unequalized read signal in a recording channel.

The programmability of decoder 23 also enables it to continuously adaptively adjust digital parameters in the decoder. More specifically, the estimated sample values at the output of decoder 23 can be monitored in comparison with the received sample values. When averaged over a preselected number of like sample values, the signal shape can be characterized in terms of the parameters $\alpha_1$, $\beta_1$, $\gamma_1$, $-\alpha_2$, $-\beta_2$, $-\gamma_2$. This information can be used to obtain the corresponding threshold constants (Table 4) and adaptively adjust the decoder for variations in the signal shape.

Also with this improved decoder structure, the decoder threshold values can be easily verified through an extensive amount of testing, and then be adjusted in accordance with the empirical results to accommodate specific anomalies in the signal.

In particular, the first set of preselected thresholds corresponding to the baseline checks $A_1$, $A_2$, $B_1$, $B_2$ is used for controlling the missing bit and extra bit errors caused by media defects-related anomalies in the incoming analog signal; the second set of preselected thresholds corresponding to the peak position checks $X_1$, $X_2$, $Y_1$, $Y_2$, $Z_1$, $Z_2$ is used for controlling peak-shift errors caused by nonlinearities-related anomalies in said signal; and the third set of preselected thresholds corresponding to the phase check p is used for controlling the propagation of errors in the decoding of said signal and creating pointers to such errors. No such flexibility is offered with the conventional Viterbi decoder.

It will now be seen that the improved method and apparatus comprises a decoder for implementing a state dependent look-ahead feature by use of a sequence detection algorithm. Appropriate functions of equalized digital sample values are precomputed for a preselected number of bits ahead of the current bit, then compared against various thresholds in the algorithm, whereupon the digitized sample values are then decoded into (1,7) coded binary data. The decoder is programmable and may be continuously adaptive to adjust digital parameters in the decoder. Finally, the benefits of partial response signalling are obtained without requiring a notch filter and the benefits of Viterbi decoding are achieved without the complexity of the conventional trellis-type Viterbi decoder.

It will be understood that various changes may be made in the device and method herein described. The embodiment illustrated is therefore to be considered merely illustrative and the invention is not to be considered limited except as specified in the claims.

TABLE 1

Decoding Equations for Positive Phase

| CURRENT STATE $a_0 b_0 c_0$ | $y_{-1}$ | TEST ON SAMPLE VALUES $y_0, y_1, y_2, y_3, y_4$ | DECODED DATA | NEXT STATE $a_1 b_1 c_1$ | $y_0$ |
|---|---|---|---|---|---|
| 110 | $-2$ or $0$ | NONE | 1 | 100 | $-4$ |
| 100 | $-4$ | $(y_0 + y_1) + (y_1 + y_2) \leq 4$ & $(y_0 + y_1) + (y_1 + y_2) - y_3 \leq 4$ or | 0 | 000 | $-2$ |
| | | $(y_0 + y_1) - (y_2 + y_3) + \lfloor (y_3 + y_4) \rfloor_{-2}^{-4} \leq -4$ | 0 | 001 | 0 |
| | | OTHERWISE* | | | |
| 000 | 0 or $-2$ | $(y_0 + y_1) + (y_1 + y_3) \leq 6$ & $(y_0 + y_1) + (y_1 + y_2) - y_3 \leq 6$ | 0 | 000 | 0 |
| | | or $(y_0 + y_1) - (y_2 + y_3) + \lfloor (y_3 + y_4) \rfloor_{-2}^{-4} \leq -2$ | | | |
| | | OTHERWISE* | 0 | 001 | 2 |
| | | *PHASE CHECK: | | | |
| 100 | — | $(y_1 + y_2) + (y_2 + y_3) \leq -7$ | ERASURE | 111 | ? |
| 000 | | | | 111 | |

*Phase check overrides all other tests.

$\lfloor \ \rfloor_a^b$ means the encolsed function is bounded below and above by a and b repectively.

TABLE 2

Decoding Equations for Negative Phase

| CURRENT STATE $a_0 b_0 c_0$ | $y_{-1}$ | TEST ON SAMPLE VALUES $y_0, y_1, y_2, y_3, y_4$ | DECODED DATA | NEXT STATE $a_1 b_1 c_1$ | $y_0$ |
|---|---|---|---|---|---|
| 001 | 2 or 0 | NONE | 1 | 011 | 4 |
| 011 | 4 | $-(y_0 + y_1) - (y_1 + y_2) \leq 4$ & $-(y_0 + y_1) - (y_1 + y_2) + y_3 \leq 4$ | 0 | 111 | 2 |

TABLE 2-continued

<table>
<tr><th colspan="2">CURRENT STATE</th><th>Decoding Equations for Negative Phase<br>TEST ON SAMPLE VALUES</th><th>DECODED<br>DATA</th><th colspan="2">NEXT STATE</th></tr>
<tr><td>$a_0\ b_0\ c_0$</td><td>$y_{-1}$</td><td>$y_0, y_1, y_2, y_3, y_4$</td><td></td><td>$a_1\ b_1\ c_1$</td><td>$y_0$</td></tr>
<tr><td></td><td></td><td>or $-(y_0 + y_1) + (y_2 + y_3) + \lfloor -(y_3 + y_4) \rfloor_{-2}^{-4} \leq -4$</td><td></td><td></td><td></td></tr>
<tr><td></td><td></td><td>OTHERWISE*</td><td>0</td><td>110</td><td>0</td></tr>
<tr><td>111</td><td>0 or 2</td><td>$-(y_0 + y_1) - (y_1 + y_2) \leq 6$ & $-(y_0 + y_1) - (y_1 + y_2) + y_3 \leq 6$</td><td>0</td><td>111</td><td>0</td></tr>
<tr><td></td><td></td><td>or $-(y_0 + y_1) + (y_2 + y_3) + \lfloor -(y_3 + y_4) \rfloor_{-2}^{-4} \leq -2$</td><td></td><td></td><td></td></tr>
<tr><td></td><td></td><td>OTHERWISE*<br>*PHASE CHECK:</td><td>0</td><td>110</td><td>$-2$</td></tr>
<tr><td>011<br>111</td><td>—</td><td>$-(y_1 + y_2) - (y_2 + y_3) \leq -7$</td><td>ERASURE</td><td>000<br>000</td><td>?</td></tr>
</table>

*Phase check overrides all other tests.

$\lfloor \quad \rfloor_a^b$ means the enclosed function is bounded below and above by a and b respectively.

TABLE 3

LOGIC FUNCTIONS for Decoder Output

1. Decoded Data and Pointer: (two output lines)
   $d_0 = a_0 b_0 \bar{c}_0 + \bar{a}_0 \bar{B}_0 c_0$ Decoded data
   $P = p(b_0 c_0 + \bar{b}_0 \bar{c}_0)$ Erasure pointer
2. Next State: (three output lines)
   $a_1 = P\bar{b}_0 + \bar{P}b_0$
   $b_1 = P\bar{b}_0 + \bar{P}c_0$
   $c_1 = P\bar{b}_0 + \bar{P}(c_0 \bar{b}_0 + R_1 a_0 b_0 + \bar{R}_1 a_0 \bar{b}_0\ 30\ R_2 a_0 c_0 + {}^{\iota s b, 13}$
   $R_2 a_0 c_0)$
   where $R_1 = A_1 B_1 + X_1 + Y_1 Z_1$
   $R_2 = A_2 B_2 + X_2 + Y_2 Z_2$
3. Detected Sample Value $\bar{\bar{y}}_0$: (five output lines)
   $a_0 b_0 c_0 = 1 \rightarrow \bar{y}_0 = 4$
   $a_0 \bar{b}_0 c_0 = 1 \rightarrow \bar{y}_0 = -4$
   $R_1 a_0 b_0 + \bar{R}_2 a_0 c_0 = 1 \rightarrow \bar{y}_0 = 2$
   $R_1 a_0 \bar{b}_0 + \bar{R}_2 a_0 c_0 = 1 \rightarrow \bar{y}_0 = -2$
   $\bar{R}_1 a_0 b_0 + {}^{\iota s b, 13} R_1 a_0 \bar{b}_0 + R_2 a_0 c_0 + R_2 a_0 c = \rightarrow \bar{y}_0\ 32\ 0$
   1

TABLE 4

<table>
<tr><th colspan="2">TEST</th><th colspan="2">Programmed Values for Thresholds<br>PROGRAMMED VALUE OF THRESHOLD</th><th>NOMINAL<br>VALUE</th></tr>
<tr><td colspan="2"></td><td>Positive Phase ($c_0 = 0$)</td><td>Negative Phase ($c_0 = 1$)</td><td></td></tr>
<tr><td colspan="5">Base-Line Check</td></tr>
<tr><td></td><td>A1</td><td>$K(A1+) = .5(\alpha_1 + 2\beta_1 + \gamma_1) - \gamma_2$</td><td>$K(A1-) = .5(\alpha_2 + 2\beta_2 + \gamma_2) - \gamma_1$</td><td>4</td></tr>
<tr><td></td><td>A2</td><td>$K(A2+) = .5(\alpha_1 + 2\beta_1 + \gamma_1)$</td><td>$K(A2-) = .5(\alpha_2 + 2\beta_2 + \gamma_2)$</td><td>6</td></tr>
<tr><td></td><td>B1</td><td>$K(B1+) = .5(\alpha_1 + 2\beta_1 + \gamma_1) - \gamma_2$</td><td>$K(B2-) = .5(\alpha_2 + 2\beta_2 + \gamma_2) - \gamma_1$</td><td>4</td></tr>
<tr><td></td><td>B2</td><td>$K(B2+) = .5(\alpha_1 + 2\beta_1 + \gamma_1)$</td><td>$K(B1-) = .5(\alpha_2 + 2\beta_2 + \gamma_2)$</td><td>6</td></tr>
<tr><td colspan="5">Peak Position Check</td></tr>
<tr><td></td><td>X1</td><td>$K(X1+) = \alpha_1 - \gamma_1 - \gamma_2$</td><td>$K(X1-) = \alpha_2 - \gamma_2 - \gamma_1$</td><td>$-2$</td></tr>
<tr><td></td><td>X2</td><td>$K(X2+) = \alpha_1 - \gamma_1$</td><td>$K(X2-) = \alpha_2 - \gamma_2$</td><td>0</td></tr>
<tr><td></td><td>Y1</td><td>$K(Y1+) = \alpha_1 - \gamma_1 + \alpha_2 - \gamma_2$</td><td>$K(Y1-) = \alpha_2 - \gamma_2 + \alpha_1 - \gamma_1$</td><td>0</td></tr>
<tr><td></td><td>Y2</td><td>$K(Y2+) = \alpha_1 - \gamma_1 + \alpha_2$</td><td>$K(Y2-) = \alpha_2 - \gamma_2 + \alpha_1$</td><td>2</td></tr>
<tr><td></td><td>Z1</td><td>$K(Z1+) = \alpha_1 - .5(\alpha_2 + \beta_2 + \gamma_2) - \gamma_2$</td><td>$K(Z1-) = \alpha_2 - .5(\alpha_1 + \beta_1 + \gamma_2) - \gamma_1$</td><td>$-4$</td></tr>
<tr><td></td><td>Z2</td><td>$K(Z2+) = \alpha_1 - .5(\alpha_2 + \beta_2 + \gamma_1)$</td><td>$K(Z2-) = \alpha_2 - .5(\alpha_1 + \beta_1 + \gamma_2)$</td><td>$-2$</td></tr>
<tr><td colspan="5">Phase Check</td></tr>
<tr><td></td><td>p</td><td>$K(p+) = -K(A2-) \times 7/6$</td><td>$K(p-) = -K(A2+) \times 7/6$</td><td>$-7$</td></tr>
</table>

Note: $\alpha_1, \beta_1, \gamma_1, -\alpha_2, -\beta_2, -\gamma_2$ are signal-shape parameters.

What is claimed is:

1. A method of processing, in a signal processing channel, digital values corresponding to a digitized incoming analog signal representative of coded binary data, comprising the steps of:
   using a state-dependant sequence detection algorithm iterated by successive clock cycles, advancing from a current state to a next state,
   precomputing appropriate functional expressions of digital sample values for a preselected number of sample values ahead of a then current sample value;
   comparing preselected ones of said functional expressions against corresponding thresholds to provide respective binary decision outputs; and
   using said binary decision outputs in conjunction with state values corresponding to the current state, determining state values for the next state following said current state, which become current state values for the next iteration of the clock cycle.

2. The method of claim I, including the step of: generating a programmed value for each threshold.

3. The method of claim 1, including the steps of: determining an expected sample value from the decision outputs and the state values corresponding to the current state; and
decoding the state values corresponding to the current state into one bit of coded binary data.

4. The method of claim 1, including the steps of: generating a programmed value for each threshold; and
adaptively modifying the programmed values according to the change in each sample value in the incoming analog signal as compared to the corresponding expected sample value.

5. The method of claim 1, including the step of: computing each threshold from digitized parameters corresponding to the analog signal shape.

6. The method of claim 5, wherein the signal shape is equalized and the parameters of the analog signal shape are ..., 0, 2, 4, 2, 0, ... and ..., 0, $-2$, $-4$, $-2$, 0, ... normalized by a scaling factor.

7. The method of claim 5, wherein the parameters of the analog signal shape are $\ldots, 0, \alpha_1, \beta_1, \gamma_1, 0, \ldots$ and $\ldots, 0, -\alpha_2, -\beta_2, -\gamma_2 0, \ldots$.

8. The method of claim 1, including the step of:
employing different thresholds for positive and negative phases of the analog signal shape as necessary to accommodate asymmetry of the signal shape.

9. The method of claim 1, including during the precomputing and comparing steps:
precomputing a baseline check and comparing it against a first preselected set of said thresholds for controlling missing bit and extra-bit errors caused by defects.

10. The method of claim 9, wherein said first set of thresholds is programmable.

11. The method of claim 1, including during the precomputing and comparing steps:
precomputing a peak position check and comparing it against a second preselected set of said thresholds for controlling peak-shift errors caused by nonlinearities in the signal.

12. The method of claim 11, wherein said second set of thresholds is programmable.

13. The method of claim 1, including during the precomputing and comparing steps:
precomputing a phase check and comparing it against a third preselected set of said thresholds for controlling the propagation of errors and creating pointers to such errors.

14. The method of claim 13, wherein said third set of thresholds is programmable.

15. The method of claim 1, including during the precomputing and comparing steps:
precomputing a baseline check and comparing it against a first preselected set of said thresholds for controlling missing bit and extra-bit errors caused by defects;
precomputing a peak position check and comparing it against a second preselected set of said thresholds for controlling peak-shift errors caused by nonlinearities in the signal; and
precomputing a phase check and comparing it against a third preselected set of said thresholds for controlling the propagation of errors and creating pointers to such errors,
each said preselected set of thresholds differing from those of the other sets.

16. The method of claim 1, including the steps of:
generating a programmed value for each threshold; and
programmably modifying values for the respective thresholds for different tracks on a disk file to optimize performance for all tracks.

17. The method of claim 1, wherein the coded binary data is in a run-length-limited code.

18. The method of claim 17, wherein the run-length-limited code is a (1,7).

19. The method of claim 1, including prior to use of the sequence algorithm, the steps of:
converting a partially equalized analog signal representative of coded binary data into a sequence of digital sample values at successive clock times; and
further equalizing the digital sample values to correspond to a predetermined analog shape.

20. The method of claim 1, including prior to use of the sequence algorithm, the steps of:
equalizing the incoming analog signal to correspond to a predetermined analog shape; and
then converting the equalized analog signal representative of coded binary data into a sequence of digital sample values at successive clock times.

21. A method of processing, in a signal processing channel, digital values corresponding to a digitized incoming analog signal representative of coded binary data, comprising the steps of:
advancing from a current state to a next state using a state-dependent sequence detection algorithm iterated by successive clock cycles; and
precomputing appropriate functional expressions of digital sample values for a preselected number of sample values ahead of a then current sample value.

22. The method of claim 21, wherein said functional expressions include, for calculating a baseline check:

$$(y_0+y_1)+(y_1+y_2), \text{ and}$$

$$(y_0+y_1)+(y_1+y_2)-y_3,$$

where y denotes sample value of an analog read signal, and the subscripts denote the look ahead count of that sample value from the then current sample value $y_0$.

23. The method of claim 21, wherein said functional expressions include, for calculating a peak position check:

$$(y_0+y_1)-(y_2+y_3), \text{ and}$$

$$(y_0+y_1)-(y_2+y_3)+(y_3+y_4),$$

where y denoted sample value of an analog read signal, and the subscripts denote the look ahead count of that sample value from the then current sample value $y_0$.

24. The method of claim 21, wherein said functional expressions include, for calculating a phase check:

$$(y_1+y_2)+(y_2+y_3),$$

where y denotes sample value of an analog read signal, and the subscripts denote the look ahead count of that sample value from the then current sample value $y_0$.

* * * * *